United States Patent [19]

Breitenfellner

[11] Patent Number: 4,612,344

[45] Date of Patent: Sep. 16, 1986

[54] FLAME-PROOFED, REINFORCED THERMOPLASTIC POLYESTER MOULDING COMPOSITION CONTAINING XONOTLITE

[75] Inventor: Franz Breitenfellner, Bensheim, Fed. Rep. of Germany

[73] Assignee: Ciba-Geigy Corporation, Ardsley, N.Y.

[21] Appl. No.: 705,054

[22] Filed: Feb. 25, 1985

Related U.S. Application Data

[63] Continuation of Ser. No. 472,345, Mar. 4, 1983, abandoned.

[30] Foreign Application Priority Data

Mar. 16, 1982 [CH] Switzerland ........................ 1638/82

[51] Int. Cl.$^4$ ................................. C08K 3/34
[52] U.S. Cl. ........................... 524/601; 260/DIG. 24; 524/371; 524/493; 524/513
[58] Field of Search ................ 524/442, 456, 493, 601

[56] References Cited

U.S. PATENT DOCUMENTS

| | | | |
|---|---|---|---|
| 3,764,576 | 10/1973 | Russo | 524/456 |
| 3,806,585 | 4/1974 | Takahashi et al. | |
| 3,953,565 | 4/1976 | Mizutani | 524/456 |
| 3,963,669 | 6/1976 | Wurmb et al. | 524/601 |
| 4,203,887 | 5/1980 | Goedde | 524/456 |
| 4,215,032 | 7/1980 | Kobayashi | 525/437 |
| 4,222,926 | 9/1980 | Mizuno | 524/456 |
| 4,362,839 | 12/1982 | Tonoki | 525/437 |
| 4,401,776 | 8/1983 | Munk | 524/443 |
| 4,410,648 | 10/1983 | Kato | 524/101 |

FOREIGN PATENT DOCUMENTS

| | | | |
|---|---|---|---|
| 38292 | 10/1981 | European Pat. Off. | |
| 47-15442 | 8/1972 | Japan | |
| 49-21097 | 5/1974 | Japan | |
| 1422607 | 1/1976 | United Kingdom | 524/601 |

OTHER PUBLICATIONS

Hackh's Chemical Dictionary, 1971, pp. 125, 725.
Kunststoff-Berater, 1971, pp. 808-809.

*Primary Examiner*—Christopher A. Henderson
*Attorney, Agent, or Firm*—Luther A. R. Hall

[57] ABSTRACT

When exposed to an open flame, the resultant polymer melt of a reinforced, flame-proofed thermoplastic polyester can be effectively prevented from dripping by the addition of xonotlite.

9 Claims, No Drawings

FLAME-PROOFED, REINFORCED THERMOPLASTIC POLYESTER MOULDING COMPOSITION CONTAINING XONOTLITE

This is a continuation of application Ser. No. 472,345, filed on Mar. 4, 1983, now abandoned.

The present invention relates to a reinforced, flame-proofed thermoplastic moulding composition which additionally contains xonotlite for inhibiting the formation of molten drops which may also burn.

Flame-proofed thermoplastic polyesters which are additionally reinforced are used principally in the electrotechnical field. Thermoplastic polyester moulding compounds have a pronounced tendency to form molten and sometimes burning drops during the combustion process. Such moulding com-positions consequently often do not comply with the safety requirements demanded of them and therefore find only limited use.

It is known that specific, finely particulate silicates (German Offenlegungsschrift No. 24 08 531), silicic acid derivatives (German Offenlegungsschrift No. 2,226,931), or fillers having a length/diameter ratio of more than 50 can be used for preventing the melt of such reinforced moulding compounds from dripping when exposed to the heat of an open flame. Examples of such additives are kaolin, talcum, bentonite, glass beads, surface-active silicic acid, oligomeric sodium silicate, asbestos, graphite or glass fibres. These additives have different disadvantages. For example, they are sufficiently effective only when used in higher concentrations, the consequence of which is a simultaneous decrease in the toughness properties. The addition and distribution of some of these additives (especially silicic acids) in the polymer is very difficult.

An undesirable lowering of viscosity is observed when using sodium silicate. There are toxicological objections to the use of asbestos.

It is the object of the present invention to provide an additive for preventing polyester moulding compositions from dripping, which additive does not have the disadvantages referred to above and which, in particular, is effective even when used in comparatively small amounts.

Accordingly, the present invention relates to a reinforced, flame-proofed moulding composition comprising in addition to conventional additives a thermoplastic polyester and an organic halogen compound as flame-proofing additive, alone or together with a compound of an element of the 5th Main Group of the Periodic Table, in particular phosphorus or antimony, which moulding composition contains 0.2 to 10% by weight of xonotlite, based on the weight of the total composition.

Linear thermoplastic polyesters suitable for the moulding materials of the invention are preferably crystalline or partly crystalline and thus have, in particular, a melting point of at least 150° C. However, they may also be amorphous, in which case the polyester then preferably has a glass transition temperature of at least 70° C., most preferably of at least 100° C. The intrinsic viscosity of the polyesters is preferably at least 0.6 dl/g, most preferably at least 0.8 dl/g.

The polyesters may be homopolymers or copolymers which are derived from aliphatic, cycloaliphatic or aromatic dicarboxylic acids and diols or hydroxycarboxylic acids. Mixtures of these polyesters are also suitable. Their composition depends substantially on the desired properties for a specific end use.

The aliphatic dicarboxylic acids may contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms, and the aromatic and cycloaliphatic hydroxycarboxylic acids 7 to 14 carbon atoms.

The aliphatic diols may contain 2 to 12 carbon atoms, the cycloaliphatic diols 5 to 8 carbon atoms and the aromatic diols 6 to 16 carbon atoms. By aromatic diols are meant those in which two hydroxyl groups are linked to one aromatic hydrocarbon radical or to different aromatic hydrocarbon radicals.

Further, the polyesters may also be branched with small amounts, e.g. 0.1 to 3 mole %, based on the dicarboxylic acids, of more than bifunctional monomers (e.g. pentaerythritol or trimellitic acid).

Polyesters consisting of at least three monomers may contain these in statistical distribution or they may be block polymers.

Suitable dicarboxylic acids are linear and branched saturated aliphatic dicarboxylic acids, aromatic dicarboxylic acids and cycloaliphatic dicarboxylic acids.

Suitable aliphatic dicarboxylic acids are those containing 2 to 40 carbon atoms, e.g. oxalic acid, malonic acid, dimethylmalonic acid, succinic acid, octadecylsuccinic acid, pimelic acid, adipic acid, trimethyladipic acid, sebacic acid, azelaic acid, and dimeric acids (dimerisation products of unsaturated aliphatic carboxylic acids, such as oleic acid), alkylated malonic and succinic acids, such as octadecylsuccinic acid.

Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxymethylcyclohexane, 4,4'-dicyclohexyldicarboxylic acid.

Examples of suitable aromatic dicarboxylic acids are: preferably terephthalic acid, isophthalic acid, o-phthalic acid, as well as 1,3-, 1,4-, 2,6- or 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)indane, 4,4'-diphenyl ether dicarboxylic acid and bis-p-(carboxyphenyl)methane.

The aromatic dicarboxylic acids are preferred, with terephthalic acid, isophthalic acid and orthophthalic acid being particularly preferred.

Further suitable dicarboxylic acids are those which contain —CO—NH—groups. They are described e.g. in German Offenlegungsschrift No. 2 414 349. Dicarboxylic acids which contain N-heterocyclic rings are also suitable, for example those which are derived from carboxyalkylated, carboxyphenylated or carboxybenzylated monoamino-s-triazinedicarboxylic acids (cf. German Offenlegungsschrift specifications Nos. 2 121 184 and 2 533 675), mono- or bishydantoins, unsubstituted or halogenated benzimidazolones, or parabanic acid. The carboxyalkyl group may contain 3 to 20 carbon atoms.

Suitable aliphatic diols are the linear and branched aliphatic glycols, in particular those containing 2 to 12, especially 2 to 6, carbon atoms in the molecule, for example: ethylene glycol, 1,2- or 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-dihydroxycyclohexane.

Further suitable aliphatic diols are e.g. 1,4-dihydroxymethylcyclohexane, aromatic-aliphatic diols, such as p-xylylene glycol or 2,5-dichloro-p-xylylene glycol, 2,2-(β-hydroxyethoxyphenyl)propane, and polyoxyalkylene glycols such as diethylene glycol, triethylene glycol or polyethylene glycol. The alkylenediols are preferably linear and contain preferably 2 to 4 carbon atoms.

Preferred diols are the alkylene diols, 1,4-dihydroxycyclohexane and 1,4-dihydroxymethylcyclohexane. Ethylene glycol and 1,4-butanediol are particularly preferred.

Further suitable aliphatic diols are the β-hydroxyalkylated, especially β-hydroxyethylated, bisphenols such as 2,2-bis-[4'-(β-hydroxyethoxy)phenyl]propane. Further bisphenols are mentioned later.

A further group of suitable aliphatic diols comprises the heterocyclic diols described in German Offenlegungsschrift specifications Nos. 1 812 003, 2 342 432, 2 342 372 and 2 453 326. Examples are:

N,N'-bis-(β-hydroxyethyl-5,5-dimethyl)hydantoin, N,N'-bis-(β-hydroxypropyl-5,5-dimethyl)hydantoin, methylene-bis-[N,N'-(β-hydroxyethyl)-5-methyl-5-ethylhydantoin], methylene-bis-[N-(β-hydroxyethyl)-5,5-dimethylhydantoin], N,N'-bis-(β-hydroxyethyl)benzimidazolone, -(tetrachloro)-benzimidazolone or -(tetrabromo)benzimidazolone.

Suitable aromatic diols are mononuclear diphenols and, in particular, binuclear diphenols which carry a hydroxyl group at each aromatic nucleus. Aromatic will be understood to mean aromatic hydrocarbon radicals such as phenylene or naphthylene. In addition e.g. to hydroquinone, particular mention is to be made of those bisphenols which may be illustrated by the following formula

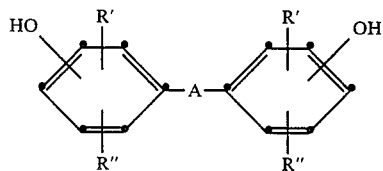

in which the hydroxyl groups may be in the meta-position, but preferably in the para-position, R' and R" may be alkyl of 1 to 6 carbon atoms, halogen such as chlorine or bromine and, in particular, hydrogen, A can be a direct bond or is O, S, SO₂, unsubstituted or substituted alkylidene, cycloalkylidene or alkylene.

Unsubstituted or substituted alkylidene is e.g.: ethylidene, 1,1- or 2,2-propylidene, 2,2-butylidene, 1,1-isobutylidene, pentylidene, hexylidene, heptylidene, octylidene, dichloroethylidene and trichloroethylidene.

Unsubstituted or substituted alkylene is e.g.: methylene, ethylene, phenylmethylene, diphenylmethylene, methylphenylmethylene. Unsubstituted or substituted cycloalkylidene is e.g.: cyclopentylidene, cyclohexylidene, cycloheptylidene and cyclooctylidene.

Examples of bisphenols are:

bis-(p-hydroxyphenyl) ether or thioether, bis-(p-hydroxyphenyl)sulfone, bis-(p-hydroxyphenyl)methane, 1,2-bis-(p-hydroxyphenyl)ethane, 1-phenyl-bis-(p-hydroxyphenyl)methane, diphenyl-bis-(p-hydroxyphenyl)methane, diphenyl-bis-(p-hydroxyphenyl)methane, 2,2-bis-(4'-hydroxy-3'-dimethylphenyl)propane, 1,1- or 2,2-bis-(p-hydroxyphenyl)butane, 1,1-dichloro- or 1,1,1-trichloro-2,2-bis-(p-hydroxyphenyl)-ethane, 1,1-bis-(p-hydroxyphenyl)cyclopentane and, in particular, 2,2-bis-(p-hydroxyphenyl)propane (bisphenol A) and 1,1-bis-(p-hydroxyphenyl)cyclohexane (bisphenol C).

Suitable polyesters of hydroxycarboxylic acids are e.g.: polycaprolactone, polypivalolactone or the polyesters of 4-hydroxycyclohexanecarboxylic acid or 4-hydroxybenzoic acid.

Polyesters with aromatic dicarboxylic acids have attained the greatest importance, especially the polyalkylene terephthalates. Preferred moulding compositions of this invention are therefore those in which the polyester consists of at least 30 mole %, preferably at least 40 mol. %, of aromatic dicarboxylic acids and at least 30 mol. %, preferably at least 40 mole %, of alkylenediols containing preferably 2 to 12 carbon atoms, based on the polyester.

In this case the alkylenediol is in particular linear and contains 2 to 6 carbon atoms, e.g. ethylene glycol, triethylene glycol, tetraethylene glycol or hexamethylene glycol, and the aromatic dicarboxylic acid is terephthalic acid and/or isophthalic acid. Particularly preferred polyesters are polyethylene and poly-1,4-butylene terephthalate and also copolyesters based on polyethylene terephthalate and poly-1,4-butylene terephthalate.

The moulding composition of the invention can additionally contain a reinforcing (fibrous) filler, e.g. asbestos fibres, carbon fibres or, in particular, glass fibres. The total amount of reinforcing filler and further additives is at most 60% by weight, based on the total composition. The fillers can be coated with an adhesion promoter in order to bind them better to the polyester. The amount of reinforcing filler is preferably 5 to 50% by weight, in particular 10 to 40% by weight.

The moulding composition of the invention preferably contains 5 to 30% by weight, preferably 5 to 20% by weight, based on the weight of the total composition, of a flame-proofing additive. Examples of suitable flame-proofing additives are organic halogen compounds, especially chlorine or bromine compounds, which are used by themselves or together with synergistic compounds of elements of the 5th Main Group of the Periodic Table, preferably phosphorus and antimony compounds, most preferably antimony trioxide.

Flame retardants based on organic chlorine-containing and/or bromine-containing compounds are known. They may be compounds which are incorporated in the plastics material as mixture component, or compounds which, as reactive monomers, are built into the polymer molecule. Examples of these last-mentioned compounds are tetrachlorophthalic anhydride, dichlorotetraphthalic acid or the lower alkyl esters thereof, tetrabromophthalic anhydride, tetrabromobisphenol A, N,N'-bis(β-hydroxyethyl)tetrachloro- or tetrabromobenzimidazolone.

Further examples of chlorine-containing and/or bromine-containing compounds are: brominated polystyrenes such as polytribromostyrene, polypentabromostyrene; decabromodiphenyl, tetrabromodiphenyl, hexabromodiphenyl ether, octabromodiphenyl ether, decabromodiphenyl ether, tetrabromodiphenylsulfide, hexabromodiphenylsulfone, 3-(2',4',6'-tribromophenoxy)-1,2-propanediol, di- or tetrabromophthalic acid and anhydrides thereof, dibromoterephthalic acid, hydroxyethylated dibromo-or tetrabromobisphenol A, tetrabromo-1,4-(dihydroxyrethyl)-benzene, tetrabromobenzimidazolone, N,N'-alkylene-bis-tetra-bromophthalimide as well as the chlorine-containing analogs. Further halogen-containing compounds are described e.g. in German Offenlegungsschrift No. 2 242 450.

In a preferred embodiment of the invention, the moulding composition of the invention contains 84.8 to 46% by weight of a thermoplastic polyester, 5 to 20% by weight of a flame-proofing additive, 10 to 30% by weight of glass fibres and 0.2 to 4% by weight of xonotlite.

The xonotlite employed in this invention may be naturally occurring xonotlite of the empirical formula $5CaO.3SiO_2.H_2O$. However, it is also possible to use synthetic xonotlite phases, especially those which are obtained by hydrothermal synthesis. These are compounds which differ only insignificantly in their water content but have the same appearance. Examples of such compounds are $5CaO.3SiO_2.1.25H_2O$ or $5CaO.5SiO_2.5/6H_2O$. Xonotlite is needle-shaped and has particle sizes in the micron range. The needles become matted to form agglomerates.

The xonotlite is preferably used in an amount of 0.2 to 6% by weight, most preferably of 0.2 to 4% by weight. It has been found that an amount of 0.2 to 2% by weight suffices for adequate effectiveness.

The thermoplastic polyesters are known and commercially available, or they can be obtained by polycondensation methods known and employed in the art.

The moulding compositions of the invention are also obtained by methods conventionally employed in the art, by incorporating the additives in the thermoplastic polyester during or after the polycondensation by adding them to the reaction mass or by regranulating the components.

Further conventional ingredients may also be added, e.g. further fillers such as talcum, mica, metal powder, silica aerosol, kaolin, calcium carbonate, dolomite, magnesium sulfate, silicates or glass beads, inorganic or organic pigments, whitening agents, dulling agents, lubricants, mould release agents, crystallisation promoters, antioxidants, light stabilisers and processing stabilisers.

The addition of xonotlite to the moulding compositions of this invention effectively inhibits the tendency of the melt to drip when subjected to burning. As it is necessary to add only small amounts of xonotlite, the good toughness properties of the moulding compositions are substantially retained and other mechanical properties undergo only insignificant change. The water content of the xonotlite does not have an adverse effect on the polyester in spite of the high processing temperatures. Incorporation of the xonotlite in the moulding composition is unproblematical and it is uniformly distributed therein.

The moulding compositions can be processed to articles of daily use of all kinds by conventional methods such as casting, compression moulding, injection moulding and extruding. Examples of such articles are industrial apparatus parts, apparatus casings, household appliances, sporting goods, electrical insulations, automobile parts, circuits, boards, films and semifinished products which can be shaped by machining. A particular utility is the manufacture of moulded articles or casings for the electrical engineering field.

The following Examples illustrate the invention in more detail.

EXAMPLES 1 AND 2

The additives listed in Table 1 below (Xonotlite VP 633-330, available from Quarzwerke GmbH, Frenchen) are incorporated in poly-1,4-butylene terephthalate (PBT, viscosity number 120 cm$^3$/g according to DIN No. 53 728/3) using a laboratory cokneader at a cylinder temperature of 250° C., and the moulding compositions so obtained are granulated. The xonotlite used may be characterised by the formula $Ca_6, Si_6, O_{17}(OH)_2$. It has a bulk density of 0.135 g/cm$^3$ and a BET specific surface area of 90 m$^2$/g (DIN No. 66132).

After the moulding compositions have dried, they are processed to mouldings ($125 \times 12.5 \times 1.6$ cm for the flammability test and $6 \times 4 \times 50$ mm for the impact strength test) according to the following conditions:
cylinder temperature: 250° C.
mould temperature: 80° C.
cycle time: 45 sec.

The samples for the flammability test are heated for 7 days at 70° C. and then subjected to the Flame Propagation Test, UL Subject 94 (see Table 2). The impact strength is determined using the standard strips.

The results show that dripping in the flammability test of the 1.6 mm thick strips can be prevented by the addition of 0.75% by weight of xonotlite. The impact strength of the moulding composition can also be kept at a good level by the addition of the small concentration of dripping inhibitor.

EXAMPLES 3 AND 4

Moulding compositions formulated as indicated in Table 1 are granulated and mouldings made therefrom in the same manner as described in Examples 1 and 2. The test results here too show the positive action of calcium hydrosilicate on the outcome of the flammability test without any noticeable impairment of the toughness properties.

TABLE 1

| Example | Composition (% = percentage by weight) | Flammability | Impact strength DIN 53453 (kJ/m$^2$) |
|---|---|---|---|
| 1 | 55.75% of PBT<br>30.0% of glass fibres<br>9.0% of decabromodiphenyloxide<br>4.50% of Sb$_2$O$_3$<br>0.75% of xonotlite | V-0<br>non-dripping | 29 |
| 2 | 56.5% of PBT<br>30.0% of glass fibres<br>9.0% of decabromodiphenyloxide<br>4.5% of Sb$_2$O$_3$ | V-0<br>dripping | 31 |
| 3 | 51.0% of PBT<br>30.0% of glass fibres<br>12.5% of polytribromostyrene<br>5.0% of Sb$_2$O$_3$<br>1.5% of xonotlite | V-0<br>non-dripping | 26 |
| 4 | 52.5% of PBT<br>30.0% of glass fibres<br>12.5% of polytribromostyrene<br>5.0% of Sb$_2$O$_3$ | V-2<br>dripping | 28 |

TABLE 2

| | UL Subject 94 Test - Vertical Test<br>Samples: 5 strips<br>Combustion: vertically for 2 × 10 sec with a 19 mm Bunsen burner flame | | | |
|---|---|---|---|---|
| Class | Burning time after removal of flame from a single sample | Total burning time after subjecting 5 samples to 10 flame treatments | Falling burning drops may ignite cotton wool | Smouldering time upon removal of the flame from a sample |
| V-0 | ≦10 | ≦50 | no | ≦30 |
| V-1 | ≦30 | ≦250 | no | ≦60 |
| V-2 | ≦30 | ≦250 | yes | ≦60 |

Additional condition for V-0, V-1 and V-2: no sample may burn or smoulder to the clamp

What is claimed is:

1. A reinforced, flame-proofed moulding composition, which consists essentially of
   (a) a thermoplastic polyester,
   (b) 5 to 30% by weight, based on the total composition, of an organic halogen compound as flame-proofing additive alone or together with a compound of an element of the 5th Main Group of the Periodic Table,
   (c) 0.2 to 10% by weight, based on the total composition, of xonotlite,
   (d) 5 to 50% by weight, based on the total composition of a reinforcing filler, and
   (e) 0 to 10% by weight, based on the total composition of a conventional additive other than poly(vinyl acetate) or ethylene/vinyl acetate copolymer, wherein the total of components (a) to (e) adds up to 100% by weight of the total composition.

2. A moulding composition according to claim 1 wherein the compound of an element of the 5th Main Group of the Periodic Table is a phosphorus or antimony compound.

3. A moulding composition according to claim 1, which contains 0.2 to 6% by weight of xonotlite, based on the weight of the total composition.

4. A moulding composition according to claim 1, which contains 0.2 to 4% by weight of xonotlite, based on the weight of the total composition.

5. A moulding composition according to claim 1, wherein the thermoplastic polyester is a polyethylene terephthalate or poly-1,4-butylene terephthalate or a copolyester based on polyethylene terephthalate or poly-1,4-butylene terephthalate.

6. A moulding composition according to claim 1, which contains 5 to 30% by weight of the flame-proofing additive and wherein the flame-proofing additive is an organic chloro or bromo compound, alone or in combination with antimony 7. A moulding composition according to claim 1, which contains 10 to 40% by weight of reinforcing filler, based on the weight of the total composition.

8. A moulding composition according to claim 7, wherein the reinforcing filler consists of glass fibres.

9. A moulding composition according to claim 1, which contains 84.8 to 46% by weight of a thermoplastic polyester, 5 to 20% by weight of a flame-proofing additive, 10 to 30% by weight of glass fibres and 0.2 to 4% by weight of xonotlite.

* * * * *